Figure 1:
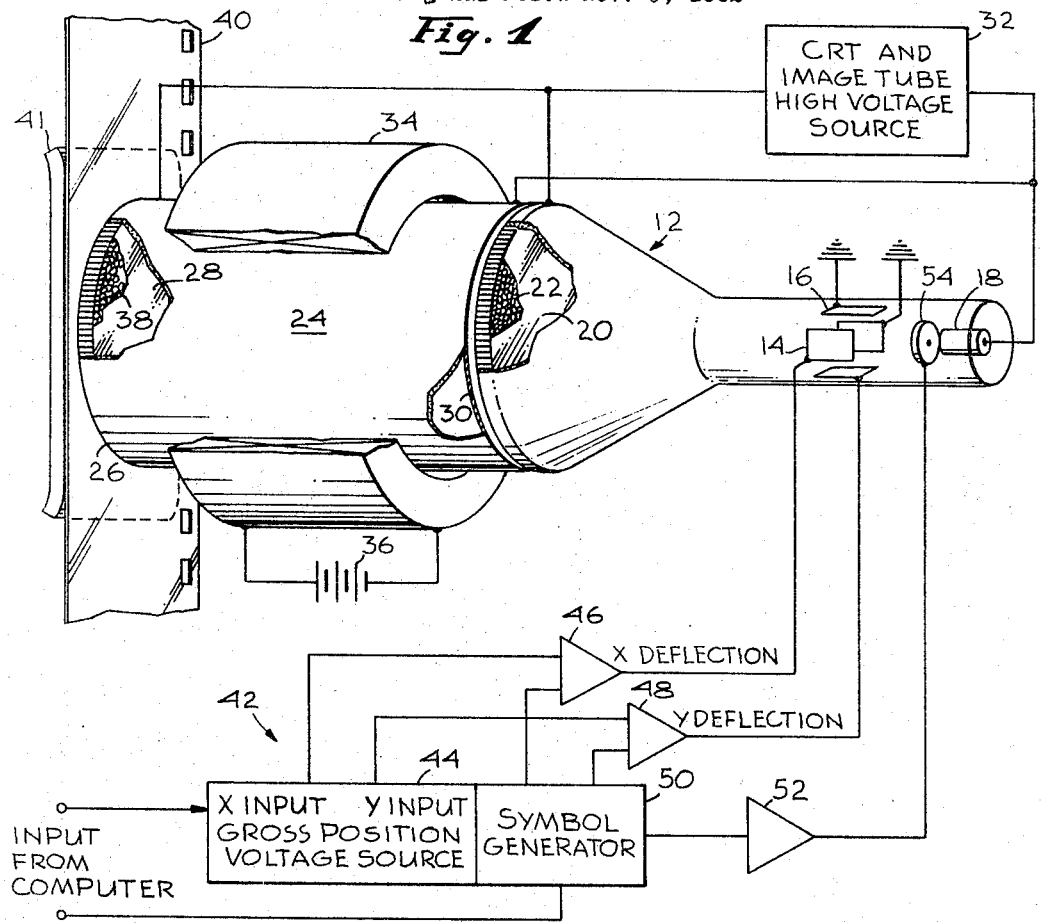

March 28, 1967 R. A. KOSTER 3,311,918

METHOD FOR EXPOSING PHOTOSENSITIVE MATERIAL

Original Filed Nov. 5, 1962

INVENTOR
ROBERT A. KOSTER
BY
Abraham Wasserman
ATTORNEY

United States Patent Office 3,311,918
Patented Mar. 28, 1967

3,311,918
METHOD FOR EXPOSING PHOTOSENSITIVE MATERIAL
Robert A. Koster, Los Angeles, Calif., assignor, by mesne assignments, to The Bunker-Ramo Corporation, Stamford, Conn., a corporation of Delaware
Original application Nov. 5, 1962, Ser. No. 235,181, now Patent No. 3,184,753, dated May 18, 1965. Divided and this application Jan. 7, 1965, Ser. No. 424,144
6 Claims. (Cl. 346—1)

This is a division of application Ser. No. 235,181, filed Nov. 5, 1962, now Patent No. 3,184,753.

This invention relates to a method for exposing photosensitive materials and more particularly to the utilization of cathode ray tube beam writing apparatus and techniques for electronically prescribing and exposing selected areas on such materials.

There is a need for improvement in techniques for the rapid exposure and development of photosensitive materials. Examples of where such techniques may be found useful are in air traffic control centers, military command posts, stock inventory and control centers and in area surveillance systems where information-bearing alphanumerics, symbols and lines are exposed on film frames or chips, which are then developed and projected onto display means. Such displays are viewed by observers who make decisions based upon the latest available information. For this reason the display must be continually updated with the latest information as soon as possible after it becomes available.

In one application an ultraviolet-light-sensitive film of the diazo compound variety is exposed through an appropriate information-bearing mask whereby a beam of light is moved over the film to draw a desired configuration of lines or symbols thereon. This type of film may be easily developed with dry processing techniques and therefore is very convenient to use. Well known films of this type are of relatively slow speed, are insensitive to ordinary or visible light, and hence may be easily handled.

While the film's insensitivity to visible light is an advantage in handling, the relatively slow speed of the film emulsion, even to ultraviolet light energy, presents a disadvantage in exposing it. The film requires exposure to a high quality of light flux, and methods of exposure through a mask or by mechanically drawing a desired configuration on the film with a beam of light make the exposure process relatively slow and not readily adaptable to the processing of high time density incoming electronically represented data.

One method and apparatus for translating electronically represented information into a light pattern for easily and rapidly exposing a film involves the use of a conventional cathode ray tube. The film is positioned adjacent the face of the tube and incoming electronically represented data is used to position and move the cathode ray beam over the tube face. As the beam moves over the tube face the phosphor coating emits radiation which exposes the film. However, it has been found that in exposing ultraviolet-light-sensitive film the ultraviolet light output of a conventional cathode ray tube is extremely low in comparison to the exposure requirements of the film. Thus, in order for a cathode ray tube to be used to expose the ultraviolet-light-sensitive film, the effective total illumination at each point on the film must be increased, either by increasing the exposure time or by increasing the intensity of the light used for exposing the film.

In most applications, a cathode ray tube has one million or more positions or points on its phosphor-coated face over which the electron beam must scan to write information thereon. Since the beam usually impinges on each point for a time interval that is inversely proportional to the total number of points, the duty cycle of the beam is very low so far as any one point on the phosphor is concerned. Data show that those phosphors which are rich in ultraviolet light emission generally emit ultraviolet energy from a point for a time of the order of less than one microsecond after the energizing beam has moved to the next position; that is, the phosphors have extremely short persistence. Thus, any given point of the film adjacent the tube face is exposed to ultraviolet light for only a small percentage of the time required for a full scan of the tube face by the electron beam. This exposure time may be increased by continuously refreshing the image with repeated beam scans bearing the same information. In this manner each point on the film repeatedly is exposed with a small amount of ultraviolet light. Nevertheless, a one-tenth microsecond exposure of each point repeated at a one hundred millisecond refresh rate, would require on the order of one million seconds (11½ days) before a typical diazo film would be adequately exposed with ultraviolet light.

In order to reduce this time, the power of the electron beam can be increased so that, at the intermittent time intervals of the low duty cycle energization of the phosphor, a greater amount of light will be available to expose each point on the film. However, most phosphors have a characteristic that an increase in the power of the electron beam impinging upon them causes a smaller percentage of this power to be converted into light energy and a greater percentage into heat, i.e., the efficiency of the phosphor decreases at high power energization levels. It has been found that before enough ultraviolet energy can be obtained to expose the film, the high intensity electron beam generates enough heat that some of the phosphor boils off the face of the tube, eventually causing a "burnout." Thus, the use of a scanning electron beam of high power to cause a phosphor to emit ultraviolet light sufficient to expose ultraviolet-light-sensitive film directly, is not practical due to the burning off of the phosphor from the face of the tube.

Continuous exposure of a particle of a phosphor to an electron beam having a low peak power but, over a given time interval, having the same average power as an intermittent beam having higher peak power, results in greater total light output and less heating of the phosphor because the phosphor is operating with higher efficiency. It thus appears that the successful exposure of ultraviolet-light-sensitive film by a pattern generated on a cathode ray tube preferably involves continuous exposure of the film to ultraviolet light radiated by a phosphor that is energized over a high duty cycle by an electron beam having an energy level well below the burn-out level for the tube. However, the requirement for scanning the electron beam over the phosphor through perhaps a million discrete positions makes it impractical to allow the electron beam to be in each position for more than a few microseconds, thus causing a very low duty cycle with respect to each position. Since these requirements of a high duty cycle exposure from a low duty cycle source are not directly compatible, an intermediate conversion apparatus is necessary.

It is therefore an object of this invention to provide a method and apparatus for translating electronically represented information into a light pattern or image and for easily and rapidly exposing a film therewith.

It is another object to provide for the exposure of ultraviolet-light-sensitive film from a cathode ray tube in accordance with incoming electronically represented data.

It is another object of the present invention to provide a means whereby ultraviolet-light-sensitive film will be exposed by radiation from a phosphor on a high duty cycle.

Briefly, the present invention is based on the concept that radiation from an intermittently excited medium or long persistence photoluminescent material may be utilized, through an intermediate conversion process, to excite a short persistence photoluminescent material virtually continuously. The long-persistence material, which may be a phosphor, is energized on a low duty cycle with relatively high energy bursts from an electron gun of a cathode ray tube or similar type of tube. However, because of its persistence, the phosphor effectively converts the low duty cycle energization to high duty cycle radiation. If then the radiation from the long-persistence phosphor can be utilized, either directly or through intermediate means, to excite the short-persistence material, such as another phosphor, points on the short-persistence phosphor can be energized at a low energy level and on a high virtually continuous duty cycle without burning the phosphor.

In one embodiment of the invention, one end of an image converter tube is positioned to receive light from the face of a cathode ray tube (CRT) having a medium or relatively long-persistence light-emitting phosphor thereon. A film to be exposed is positioned at the other end of the image-converter tube. The image converter tube has a photocathode at its end nearest the face of the CRT, which emits electrons in response to light energy incident thereon. At the other end of the tube is an anode and a short-persistence phosphor to which electrons emitted by the photocathode are accelerated because of a voltage difference between the cathode and anode. The light image on the face of the cathode ray tube, which may be produced in accordance with incoming electronically represented data, is transferred onto the photocathode of the image converter tube. The photocathode, in turn, provides a similar electron image which excites the short-persistence phosphor at the anode end of the tube, thus providing a similar light image for exposing the film. The light image on the face of the CRT is refreshed periodically at a rate to provide a virtually continuous output from the photocathode of the image converter tube, which in turn causes virtually continuous exposure of the film over a high duty cycle. In another embodiment a novel tube of unitary construction is provided that will perform all of the energy conversions within itself that are necessary for exposing relatively slow speed photosensitive film in accordance with high time density electronically represented incoming data.

Figure 2:
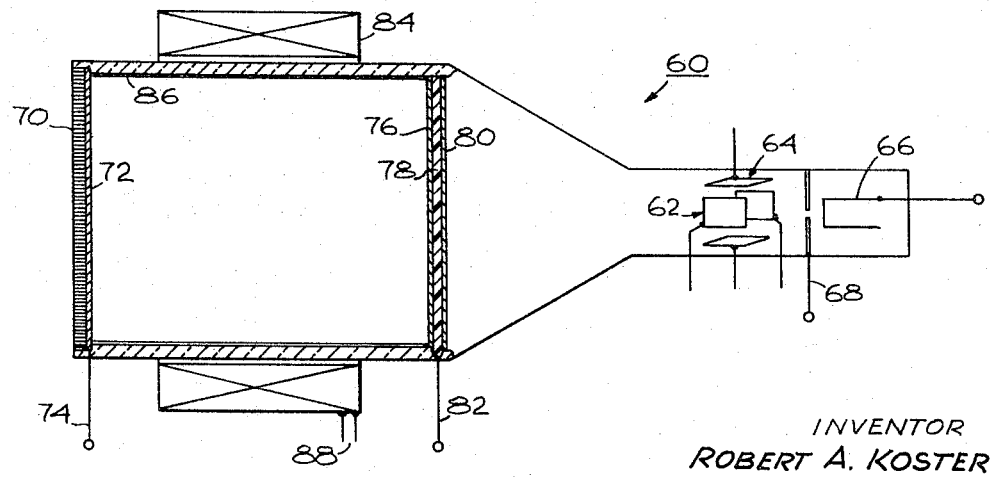

The invention will be better understood from the following description, taken in conjunction with the accompanying drawings, wherein:

FIG. 1 is a perspective view, with parts broken away, showing one embodiment of the invention wherein the film is exposed in accordance with incoming electronically represented data through the use of a cathode ray tube and an image tube; and FIG. 2 is a sectional view of a novel energy conversion tube of unitary construction for converting incoming electronically represented data into a light image.

Referring now to FIG. 1, there is shown a conventional cathode ray tube 12 having horizontal and vertical deflection plates 14 and 16. An electron gun 18 provides an electron beam which impinges on a photoluminescent material such as a phosphor 20 coated on a faceplate 22 or target of the tube. This phosphor may be of a medium or long persistence type that might have a persistence falling within a range of 40 to 200 milliseconds. One such phosphor that may be used is known as P–4 type. P-numbers are assigned to phosphors by the Electronic Industries Association, New York, N.Y., and full information concerning phosphors is readily available when reference is made to their P-number. All phosphors having the same P-number are intended to have identical characteristics. Faceplate 22 preferably includes optical fibers extending through the plate to its outer face to transmit the phosphor-generated light therethrough with high resolution. Deflection and focusing of the beam may be either electrostatic, as shown, or electromagnetic, not shown.

An image converter tube 24 is constructed with a photocathode end and an anode end. The anode end of the image converter tube contains a faceplate 26 coated with a short-persistence ultraviolet light radiating phosphor 28 such as a P–16 type, for example. P–16 denotes a phosphor which is rich in ultraviolet light radiation and has a very short persistence, on the order of 0.5 microsecond. The photocathode end contains a photoemissive material 30 that emits electrons from all portions thereof that are exposed to light, such as emitted from the spot on the face of the cathode ray tube. The photoemissive material 30 is chosen to provide the most suitable response to the radiation from the phosphor 20 on the faceplate of tube 12. A photocathode material of the S–11 type is preferable as its spectral response matches very closely the wavelengths of the radiation from P–4 phosphor, a phosphor type frequently used in cathode ray tubes. S-numbers are assigned to photocathode materials by the Electronic Industries Association also, and identify materials of presumably identical composition and spectral response. It should be understood that other P and S numbered materials may be used provided that they are so matched that the spectral response of the photocathode corresponds generally to the spectral range of emission of the phosphor.

The photocathode end of the image converter tube is placed adjacent the cathode ray tube faceplate 22. Light emitted from the light image on the face 22 of the cathode ray tube 12 causes the photocathode material 30 of the image tube 24 to emit electrons to provide a similar electron image. The electrons are accelerated to the P–16 phosphor at the anode end of the tube 24 by a potential difference on the order of 10 to 20 kilovolts supplied from a conventional high voltage source 32 connected between the anode and photocathode, which source also energizes the cathode ray tube 12. The electron beams thus formed are focused on the phosphor-bearing faceplate 26 at the anode end of the image converter tube 24 by focusing coils 34, which are conventionally energized by another power source 36.

The faceplate 26 at the anode end of the image tube 24 preferably contains optical fibers 38, which lessen dispersion, improve the transfer of energy through the faceplate, and provide for greater effective resolution. While fiber optics is preferable, any high efficiency, high resolution optical system may be used for transferring the energy through the faceplate to a film 40 adjacent this faceplate. Any suitable framework 41 may be used to retain the film in place during the exposure period. In operation, the desired light image is generated on the face of the cathode ray tube and is refreshed periodically, such as every thirty to forty milliseconds. Thus, because of the persistence of the P–4 phosphor 20, an image is provided continuously on the photocathode of the image tube. This, in turn, provides an electron image which continuously excites the photoluminescent P–16 phosphor 28 adjacent the ultraviolet-light-sensitive film 40 over a 100 percent duty cycle.

Voltages are provided by an information writing system 42 for deflecting the electron beam in the cathode ray tube 12 in accordance with information to be recorded on the film. In one arrangement the information writing system may include a computer controlled digital register and a digital-to-analog converter, shown generally as a gross position voltage source 44, for supplying gross position voltages to deflect the electron beam to a desired position for recording information on the film. This gross position voltage source 44 supplies voltages to conventional X and Y deflection amplifiers 46 and 48, the outputs of which are respectively connected to the deflection plates 14 and 16. The information writing system may also include means for generating symbols such as, for example, a symbol generator 50 available commercially from CBS Laboratories, Stamford, Connecticut, and known under the trade name "Vidiac." This symbol generator 50 also provides voltages to amplifiers 46, 48 which are connected to the deflection plates 14, 16 to deflect the electron beam to define the prescribed symbols on the face of the cathode ray tube. The symbol generator also provides intensity control signals which are amplified by another conventional amplifier 52 connected to beam intensity modulation apparatus 54 of the cathode ray tube 12. The cathode ray tube light image is refreshed at a rate, depending upon the persistence of the phosphor 20 on faceplate 22, such that the photocathode material 30 of image tube 24 is continuously excited by the light image and continuously emits electrons. As previously noted, a 30 to 40 millisecond refresh rate is more than adequate when the phosphor 20 has a persistence within a range of 40 to 200 milliseconds. Usually, less than two seconds is sufficient time to expose a typical film in the manner above described. The film is then processed, such as by heating to develop the image, and is ready for use within seconds from the time information is first written onto the cathode ray tube phosphor by the electron beam.

In the embodiment shown in FIG. 2, the energy conversions performed by the image tube 24 and cathode ray tube 12 shown in FIG. 1 are performed by a single tube 60 of unitary construction. Here the cathode end of the tube, i.e., the electron beam generator and deflection apparatus, is conventional and may consist of X and Y deflection plates 62, 64, and electron gun 66, and a beam intensity modulator 68. Electromagnetic coils around the neck of the tube, rather than electrostatic deflection plates, may be used for beam deflection purposes if desired. Suitable leads are provided for connection with external circuitry and energy sources, not shown. The anode end of the tube includes a fiber optics faceplate 70 with an ultraviolet-light-radiating-phosphor coating 72 on its inner surface. A suitable lead 74 connected thereto extends through the body of the tube for connection to a high voltage source, not shown. The purpose of such a connection is to provide a potential to accelerate the flow of electrons from a photoemissive cathode, as will be explained hereinafter.

Positioned between the anode faceplate 70 and the electron gun 66 is a very thin transparent supporting material 78, such as a sheet of mica. On the side of the sheet facing the electron gun 66 is a coating of a phosphor 80, and on the side facing the anode faceplate 70 is a coating of phoemissive material 76 which acts as a photocathode. Both coatings 76 and 80 are connected to a common electrical lead 82 to maintain them at the same potential. As previously stated, the supporting material 78 is made very thin to prevent, as nearly as possible, dispersion of light between the phosphor 80 and the photocathode 76. Since the tube is evacuated to a low pressure on both sides of the supporting material 78, the material is not subjected to any differential pressures and hence may be made quite thin without danger of breaking. A focusing coil 84 is positioned around the cylindrical body 86 of the tube and has electrical leads 88 for connection to an energizing source, not shown. This coil is for the purpose of focusing the electrons emitted from the photoemissive material 76 on the phosphor 72.

Certain phosphors are available in sheet form. Therefore, if such a sheet phosphor is utilized for the phosphor 80, the photoemissive material 76 may be coated on it directly and the supporting material 78 eliminated.

The operation of the embodiment of the invention shown in FIG. 2 is similar to that described with reference to FIG. 1. The persistence of phosphor 80 is such that the refresh rate of the information writing system with which the tube is to be used provides substantially continuous phosphor-generated illumination to be received by the photoemissive material. The photocathode, in turn, emits electrons from all portions that receive light from the phosphor. Substantially continuous streams of electrons impinge on the phosphor 72, on a high virtually continuous duty cycle, in the form of an electron image similar to the light image on phosphor 80 resulting from the low duty cycle impingement of a single electron beam swept thereover. Thus, the light image created on the faceplate 70 is provided virtually continuously. Also, as pointed out in connection with FIG. 1, the wavelength of the phosphor 80 and the spectral response of the photoemissive material 76 are closely matched so that the transfer of energy is the most efficient possible.

The above-described embodiments are by way of illustration only and exemplify the conversion of a light image produced in response to high energy electron bursts on a short duty cycle to a more efficient and useful light image produced in response to low peak electron energy provided on a high duty cycle. The light image provided adjacent the photosensitive material to be exposed may be larger, smaller, or the same size as the light image generated on the first phosphor by the electron gun. The spacing between the ends of the image tube is not critical, and, in some instances, it may be preferable to position the film-exposing phosphor adjacent the photocathode or even deposit the two materials on the same surface. Although the invention has been described with reference to the exposing of ultraviolet-light-sensitive film with a cathode ray tube, it is understood that the invention is not limited to the use of any particular type or types of film or other photosensitive material to be exposed nor to the use of any particular type or types of exposing energy.

From the foregoing description it will be apparent that many improvements and modifications will readily occur to one skilled in the art. It is therefore to be understood that the scope of this invention is not limited to the embodiments illustrated but is to be defined by a just interpretation of the appended claims.

What is claimed is:

1. A method of exposing a relatively slow speed photosensitive material by means of light emitted from a short persistence phosphor, which method comprises;
    exciting a relatively long persistence phosphor in accordance with information to be recorded on said material to provide a first light image substantially continuously,
    converting said first light image into a similar electron image,
    exciting said short persistence phosphor from said electron image to provide a second light image substantially continuously, and
    exposing said film to said second light image.

2. A method of exposing a relatively slow speed photosensitive material by means of light emitted from a short persistence phosphor, which method comprises:
    intermittently exciting portions of a relatively long persistence phosyphor in accordance with information to be recorded on said material to provide a first light image substantially continuously,
    converting said first light image into a similar electron image,
    exciting said short persistence phosphor from said electron image to provide a second light image substantially continuously, and
    exposing said film to said second light image.

3. A method of recording electronically represented data on a relatively slow speed ultraviolet light sensitive material comprising the steps of:
    converting said data into a substantially continuous light image, converting said light image into a similar electron image, substantially continuously exciting a short persistence ultraviolet light emitting material with said electron image to provide a similar ultraviolet light image, positioning said ultraviolet light sensitive material adjacent said ultraviolet light image to be exposed thereby, and subjecting said ultraviolet light sensitive material to processing techniques to retain the data thereon in permanent form.

4. A method of producing ultraviolet energy sufficient to expose an ultraviolet light sensitive material of relatively slow photographic speed, the steps comprising:

intermittently exciting a first photoluminescent surface with radiated energy representing predetermined data for substantially continuously providing a first light image having a first radiation spectrum;

substantially continuously energizing a photoemissive surface with said first light image for providing a substantially continuous electron image corresponding to said first light image;

and substantially continuously energizing a second photoluminescent surface with electrons from said electron image to produce a second radiation spectrum different from said first radiation spectrum in that the ultraviolet radiation therein is substantially greater than the ultraviolet radiation in said first radiation spectrum for providing a substantially continuous second light image of ultraviolet radiation sufficient to expose said ultraviolet light sensitive material of relatively slow photographic speed.

5. A method of recording data which is intermittently electronically supplied to a cathode ray tube on material which is sensitive to a predetermined radiation energy spectrum, and which has a relatively slow photographic speed, the steps comprising:

converting the data which is intermittently electronically supplied to said cathode ray tube at a predetermined repetition rate into a first substantially continuous light image of a first radiation spectrum;

energizing a photoemissive surface with light from said substantially continuous light image for producing a corresponding substantially continuous electron image;

substantially continuously energizing a photoluminescent surface with electrons from said electron image, said photoluminescent surface having short persistence characteristics and a radiation spectrum comprising a high degree of energy radiation within said predetermined radiation energy spectrum for substantially continuously producing a second light image;

and exposing said material to said second light image.

6. A method of recording on low photographic speed ultraviolet light sensitive photographic material data generated at electronic speeds supplied to a cathode ray tube, the steps comprising:

converting data which is intermittently electronically supplied to said cathode ray tube at a predetermined repetition rate into a first light image which is substantially continuously produced and whose radiation contains a substantially low component of ultraviolet energy;

energizing a photoemissive surface with light from said first substantially continuous light image for producing a substantially continuous electron image;

substantially continuously energizing a photoluminescent surface which has a short persistence and a high component of ultraviolet energy radiation characteristic with electron image for substantially continuously producing a second light image whose emitted ultraviolet energy radiation is sufficient to expose said low speed ultraviolet light sensitive photographic material;

and exposing said photographic material to said second light image so as to record said data thereon.

References Cited by the Examiner

UNITED STATES PATENTS

| | | | |
|---|---|---|---|
| 2,015,570 | 9/1935 | Sabbah et al. | 346—110 |
| 2,808,768 | 10/1957 | Squassoni | 95—4.5 |
| 2,839,602 | 6/1958 | Fries | 178—6.7 X |
| 3,027,219 | 3/1962 | Bradley | 346—110 |
| 3,145,072 | 8/1964 | Daly et al. | 346—110 |
| 3,220,012 | 11/1965 | Schwertz | 346—74 |
| 3,235,658 | 2/1966 | Levy | 178—6.7 |

RICHARD B. WILKINSON, *Primary Examiner.*

J. G. MURRAY, *Assistant Examiner.*